(12) United States Patent
Hamilton

(10) Patent No.: US 6,317,235 B1
(45) Date of Patent: Nov. 13, 2001

(54) METHOD AND SYSTEM FOR PREVENTING BURN-OUT OF INFRARED TRANSMITTER DIODES

(75) Inventor: T. Allan Hamilton, San Jose, CA (US)

(73) Assignee: Zilog, Inc., Campbell, CA (US)

( * ) Notice: Subject to any disclaimer, the term of this patent is extended or adjusted under 35 U.S.C. 154(b) by 0 days.

(21) Appl. No.: 09/143,150

(22) Filed: Aug. 28, 1998

(51) Int. Cl.$^7$ ................................................. H04B 10/00
(52) U.S. Cl. ........................... 359/152; 359/153; 359/187
(58) Field of Search .......................... 359/152, 153, 359/157

(56) References Cited

U.S. PATENT DOCUMENTS

| | | | |
|---|---|---|---|
| 5,073,838 | * | 12/1991 | Ames ..................................... 361/103 |
| 5,118,964 | * | 6/1992 | McArdle ................................ 307/117 |
| 5,379,145 | * | 1/1995 | Nodine .................................. 359/187 |
| 5,602,860 | * | 2/1997 | Masonson .............................. 372/34 |
| 5,663,823 | * | 9/1997 | Suzuki .................................. 359/181 |
| 5,786,921 | * | 7/1998 | Wang et al. ........................... 359/152 |
| 5,844,928 | * | 12/1998 | Shastri et al. .......................... 372/38 |
| 5,978,395 | * | 11/1999 | Nomura ................................. 372/34 |

* cited by examiner

Primary Examiner—Leslie Pascal
Assistant Examiner—Hanh Phan
(74) Attorney, Agent, or Firm—Steins & Associates

(57) ABSTRACT

A Method and System for Preventing Burn-out of Infrared Transmitter Diodes is disclosed. The preferred method and system detects when the Ir transmitter(s) are approaching or have achieved an overtemperature condition. Once an overtemperature condition is detected, the preferred system will interrupt electrical transmit power to the transmitter until such time as the overtemperature condition is dissipated. Furthermore, the system and method will send a standby signal to the Central Processing Unit or communications controller when an overtemperature condition is detected. Finally, it is yet another feature that the system emit status signals perceptible to the human senses when normal and abnormal temperature conditions are detected in the transmitter.

15 Claims, 5 Drawing Sheets

METHOD AND SYSTEM FOR PREVENTING BURN-OUT OF INFRARED TRANSMITTER DIODES

BACKGROUND OF THE INVENTION

1. Field of the Invention

This invention relates generally to infrared communications systems and, more specifically, to a Method and System for Preventing Burn-out of Infrared Transmitter Diodes.

2. Description of Related Art

As technology becomes continually more accessible to the "common man," the ability to use, store, transfer and otherwise manipulate information has become the focus of most businesses as well as for the individual consumer. Access to the information resources is commonly by some sort of network system, including World Wide Web, "Intranets", local area networks, wide area networks, as well as corporate databases.

While the conventional method for connecting to one of these information networks has been via cable and wire, as the reliance upon connectivity to information has deepened, the desire to gain such access from mobile or portable devices has strengthened. These portable devices, such as Personal Digital Assistants, hand-held computers, cellular telephones, and even digital cameras are now being connected to each other and to networks via Infrared Data Communications. In fact, it is virtually impossible to purchase a notebook computer today that does not include an Infrared Data Communications assembly resident within it.

FIG. 1 depicts a significant problem with the conventional Infrared-enabled appliance; it is an illustration of such an appliance 10. In its pertinent form, the typical Ir-enabled appliance 10 includes an infrared transceiver system 12 that is, for the purposes of this discussion, provided electrical power 14 by a power supply means 16, such as an internal battery or an external cable. Within the transceiver system 12, among other devices and circuits, there are typically at least one infrared transmitter 18 (or transmitter array) and at least one receiver 20 (or receiver array).

Under normal transmission conditions, when the Central Processing Unit 22 (or other control device or system) sends data to the communications controller 24 for transmission by the Ir transmitter 18, the controller 24 converts the data into a transmit data signal 26. A transmit data signal 26 is essentially a string of "power-off's" and "power-on's", which represent digital zero's and one's, respectfully. A "power-on" causes the transmitter 18 to emit an infrared signal 28. While transmitting normally, these "power-on's" and "power-off's" are of very short duration—on the order of less than one-tenth (0.1) second each.

Under certain power-up modes, however, the appliance 10 may direct or otherwise cause the power 14 to be energized to the transceiver 12, and more specifically, to create a "power-on" to the transmitter 18 for a substantial period of time. Furthermore, it is somewhat common for the CPU 22 to "lock up" or otherwise go into a "hang mode" during a variety of operations (or error conditions)—sometimes this, too can create a "power-on" condition in the transmitter 18.

The problem addressed by the present invention relates to the damage incurred by the transmitter 18 when the appliance is undergoing one of these power-up modes. It has been observed that the transmitter diode temperature 28 (represented by the thermometer here) of the typical infrared transmitter 18 will reach dangerously high levels if the transmit data signal 26 to the transmitter 18 is left in the "power-on" condition for periods in excess of 5 to 10 seconds. After being subjected to these high temperatures 22, particularly on a repeated basis, the typical transmitter 18 will fail due to thermal burn-out. What is needed is an improved transceiver system and method to prevent transmitter over-temp and subsequent failure due to prolonged "power-up" conditions.

SUMMARY OF THE INVENTION

In light of the aforementioned problems associated with the prior methods and devices, it is an object of the present invention to provide a Method and System for Preventing Burn-out of Infrared Transmitter Diodes. The preferred method and system will detect when the Ir transmitter(s) are approaching or have achieved an overtemperature condition. Once an overtemperature condition is detected, the preferred system should interrupt electrical transmit power to said transmitter until such time as said overtemperature condition is dissipated. It is a further object that the system and method send a standby signal to the Central Processing Unit or communications controller when an overtemperature condition is detected. It is a still further object that the system emit status signals perceptible to the human senses when normal and abnormal temperature conditions are detected in the transmitter.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, of which:

DETAILED DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide a Method and System for Preventing Burn-out of Infrared Transmitter Diodes.

Figure 1:
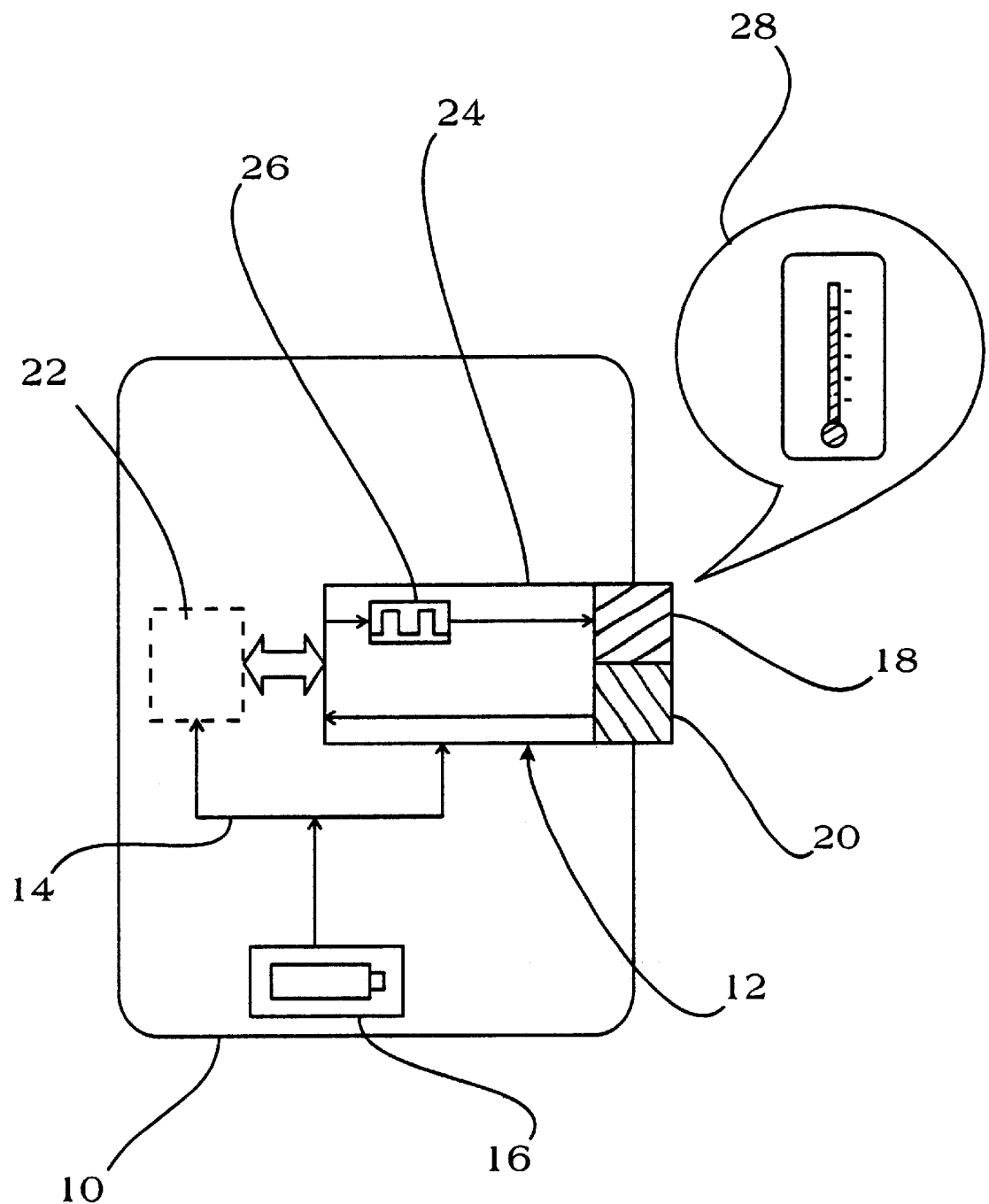
FIG. 1 is an illustration of a prior Infrared-enabled appliance having a conventional Infrared transceiver system.
Figure 2:
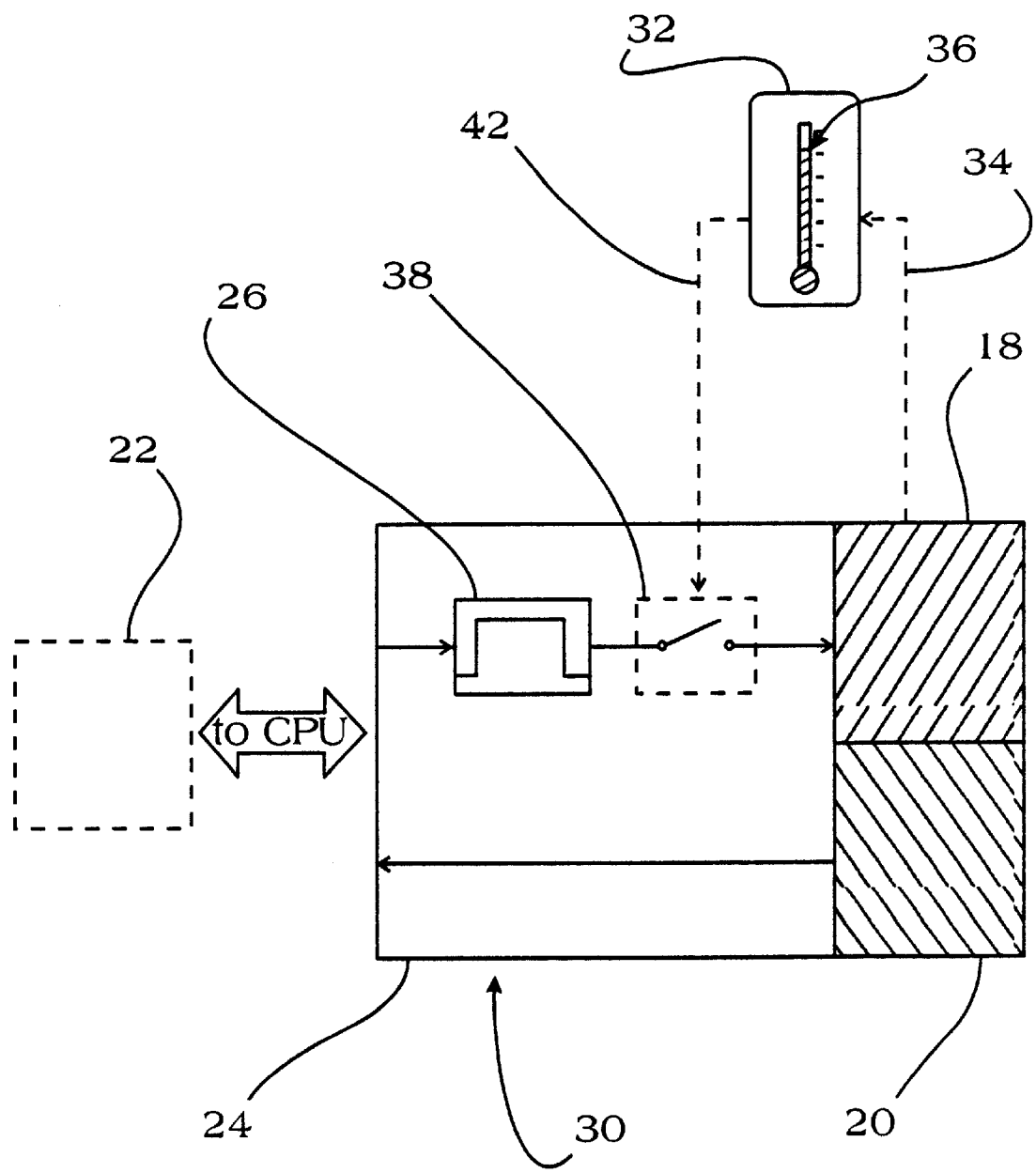
FIG. 2 is an illustration of the improved Infrared transceiver system of the present invention, including a temperature sensing and control system.

The present invention can best be understood by initial consideration of FIG. 2. FIG. 2 is an illustration of the improved Infrared transceiver system 30 of the present invention, including a temperature sensing and control means 32. In this embodiment, the temperature sensing and control means 32 is thermally coupled to the Ir transmitter 18, such that a temperature signal 34, proportional to the temperature of the transmitter 18, is detected by it. The temperature sensing and control means 32 might be provided by a variety of conventional systems and devices, including arrangements including thermocouples, thermistors and simple temperature switches, among others.

When the temperature sensing and control means 32 receives a temperature signal 34 that correlates to an overtemperature condition 36 within the Ir transmitter 18, the sensing and control means 32 sends a deactivate signal 38 to a switch means 40. The switch means 40 is in circuit between the communications controller 24 and the Ir transmitter 18; deactivating the switch means 40 removes the transmit signal 26 from the Ir transmitter 18. In operation, then, when operating conditions cause the Ir transmitter 18 to reach a dangerously high temperature, it's drive current is disconnected from the transmitter 18 before burn-out temperature is reached. The preferred switch means 40 may be a number of conventional circuits and devices, including mechanical, electromechanical and/or electronic components that are capable of cycling from a closed to an open condition in response to an external control signal emanating from the temperature sensing and control means 32.

Figure 3:
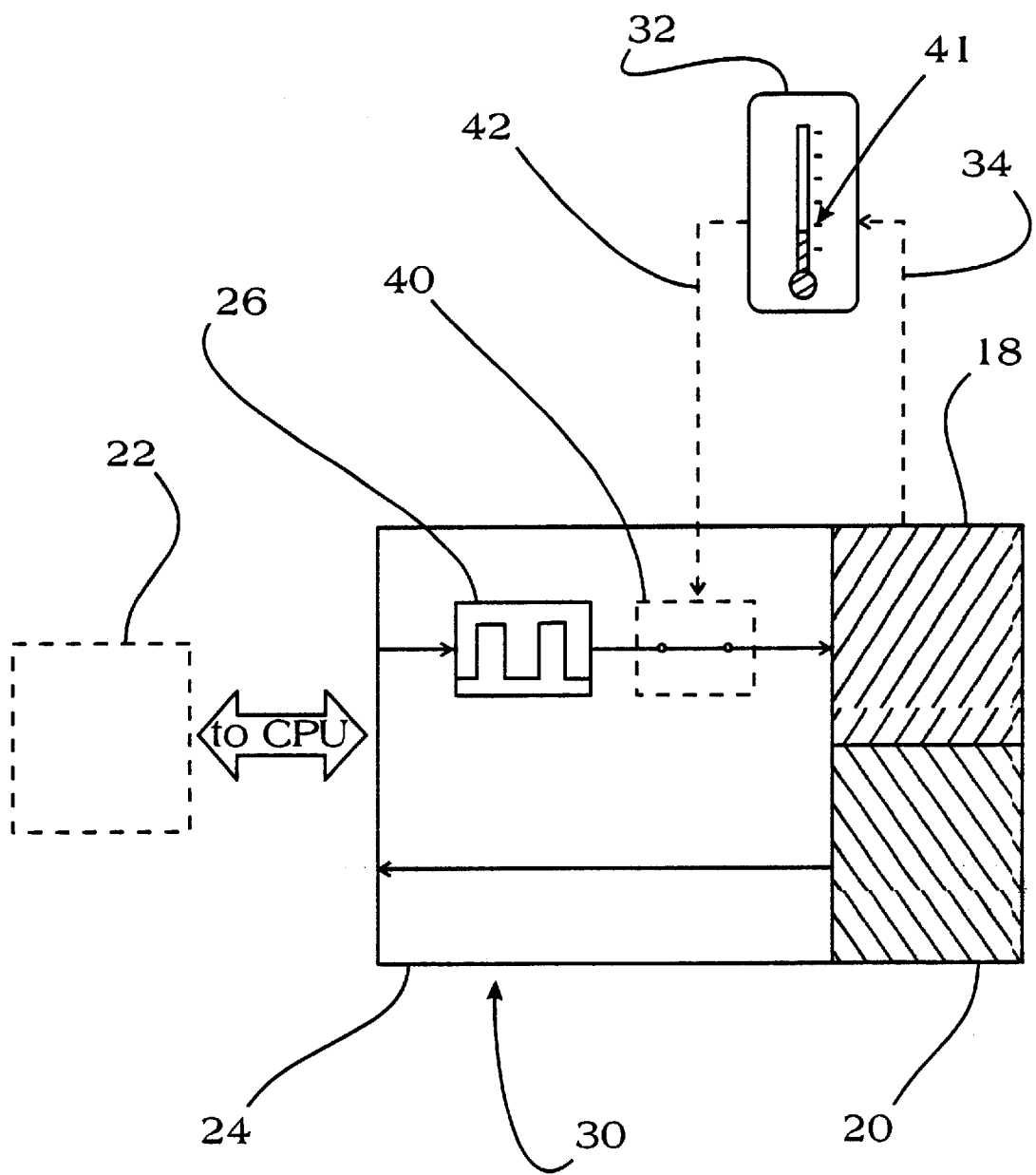
FIG. 3 is an illustration of the system of FIG. 2, depicting the temperature sensing and control system under normal operating temperatures.

Similarly, as depicted by FIG. 3, when the transmitter temperature has reduced to a safe condition 41, as sensed by the temperature sensing and control means 32, an activate signal 42 will be sent to the switch means 40, thereby directing it to close the circuit. Once closed, the transmit data signal 26 will again be re-established to the Ir transmitter.

Figure 4A:
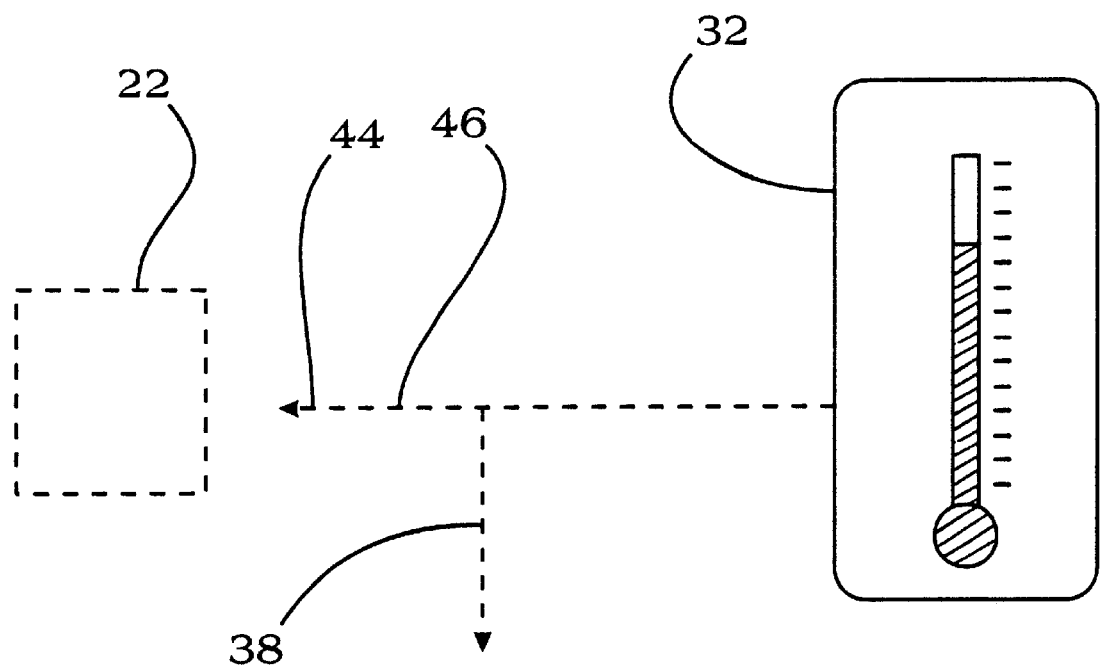
FIGS. 4A and 4B are illustrations of embodiments of the present invention that will provide additional safety and reliability benefits.
Figure 4B:
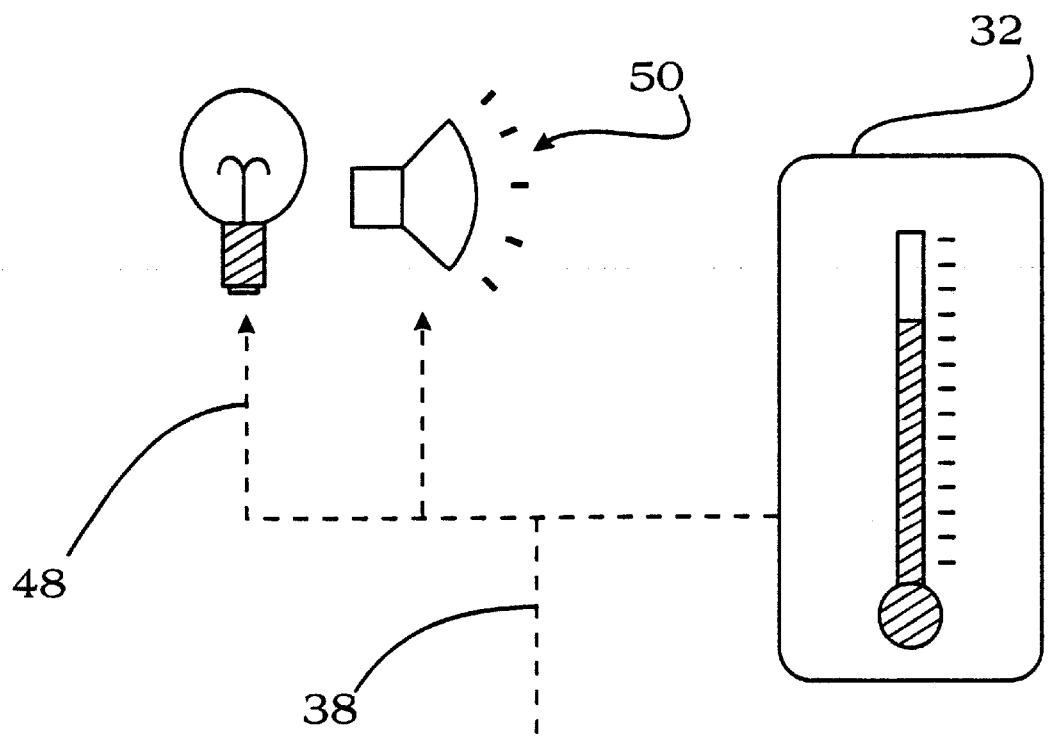

In other more complicated embodiments, as depicted by FIGS. 4A and 4B, the potential for loss of transmitted data during over-temperature shut-off's may be addressed. Specifically, the switch means 40 or temperature sensing and control means 32 may send a "temperature standby" signal 44 to the Central Processing Unit (or communications controller). Upon receiving the "temperature standby" signal 44, the CPU and/or communications controller will stop sending data for transmission by the transceiver system 30. Once the Ir transmitter 18 has reached a safe temperature, the switch means 40 or temperature sensing and control means 32 will send a "resume transmissions" signal 46 to the CPU and/or communications controller 24, after receipt of which, the sending of data for Ir transmission will resume.

FIG. 4B depicts yet another embodiment, wherein the temperature sensing and control means 32 may include an external visual 48, audible 50, and/or other warning signal for notifying the user that the Ir transmitter 18 has been deactivated to prevent temperature damage to the device and system. Furthermore, the sensing and control means 32 might issue another external or internal alert when the Ir transmitter 18 has actually been damaged and therefore requires replacement. Similarly, the sensing and control means 32 could be capable of recording and internally trending the temperature "fatigue" experienced by the Ir transmitter due to repetitive cycling to high temperatures—in this manner, burn-out failure could be predicted by the improved sensing and control means 32 so that the transmitter 18 could be replaced before a failure actually happens.

Figure 5:
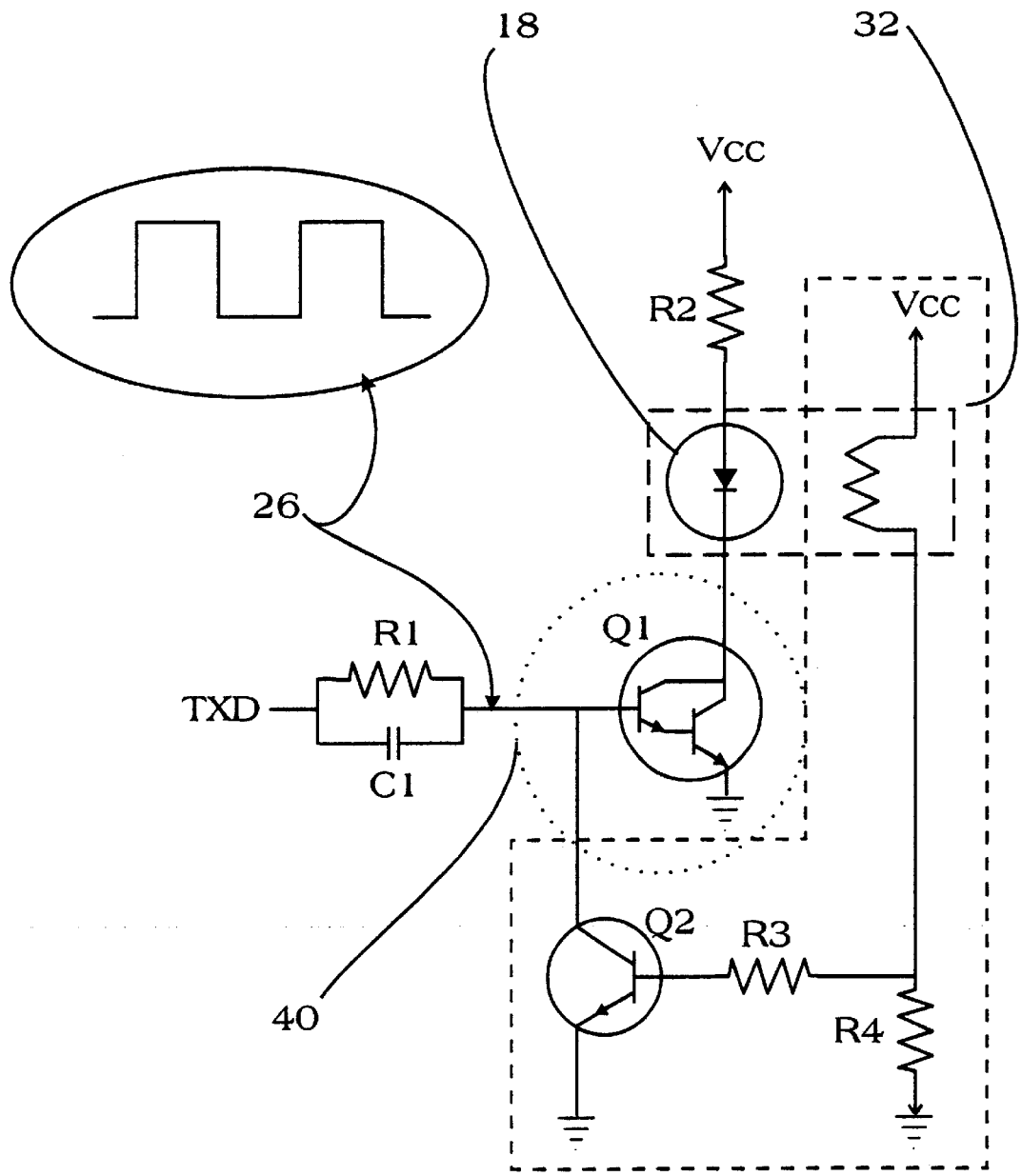
FIG. 5 is a preferred circuit diagram of a conventional Infrared transmitting paired with the temperature sensing and control system of the present invention.

FIG. 5 is a preferred circuit diagram of a conventional Infrared transmitter 18 paired with the temperature sensing and control system 32 of the present invention. In this embodiment, the temperature sensing and control means 32 comprises a temperature dependent drive device that is tightly thermally coupled to the transmitter 18. Upon reaching an overtemperature condition, the drive voltage to Q2 is increased, thereby removing the base drive voltage to Q1 of the switch means 40, and causing the input power (of the transmit data signal 26) to be lowered or totally interrupted before the transmitter 18 is damaged.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. An improved infrared transceiver system for infrared-enabled appliances, comprising:
   at least one infrared signal transmitter;
   a transmitter power supply for supplying electrical power to said transmitters;
   a transmit power switch for interrupting said electrical power to said transmitters when said switch is deactivated;
   a temperature sensor for sensing an overtemperature condition in said transmitters and responsively sending a temperature standby signal to said appliance and further deactivating said switch, said temperature sensor configured for sensing a normal condition and responsively sending a resume transmit signal to said appliance and further activating said switch.

2. The system of claim 1, wherein said temperature sensor is further configured to detect a normal-temperature condition in said transmitter and responsively activating said switch.

3. The system of claim 1, wherein said temperature sensor comprises a temperature-dependent drive device, said drive device being thermally consistent with said transmitter.

4. The system of claim 3, wherein said temperature-dependent drive device comprises a thermister.

5. The system of claim 1, wherein said temperature sensor comprises a temperature sensitive drive circuit, said circuit thermally coupled to said transmitter.

6. The system of claim 1, wherein said switch further comprises a drive circuit, said drive circuit being responsive to said temperature sensor.

7. The system of claim 1, further comprising warning means for emitting signals perceptible to the human senses when said overtemperature condition is sensed.

8. A method for improving the longevity of an infrared transceiver system for infrared-enabled appliances comprising an infrared signal transmitter, a transmitter power supply for supplying electrical power to said transmitter and a switch for interrupting electrical power supplied to said transmitter, comprising the steps of:
   detecting an overtemperature condition in said transmitter;
   commanding said switch to interrupt said power supply responsively to said detecting;
   sending a temperature standby signal to said appliance;
   detecting a normal temperature condition in said transmitter;
   commanding said switch to restore said power supply responsively to said second detecting; and
   sending a resume transmit signal to said appliance.

9. The method of claim 8, wherein said detecting is accomplished by a temperature dependent drive device, said device thermally coupled to said transmitter.

10. An improved infrared transmitter system, comprising:

an infrared transmitter;

a power supply for supplying electrical power to said transmitter;

a switch for activating and deactivating said power supply; and a temperature sensing and control device for sensing an over-temperature condition in said transmitter and responsively commanding said switch to deactivate said power supply, said temperature sensing and control device further configured for sensing a normal temperature condition in said transmitter and responsively commanding said switch to activate said power supply and further comprising a standby/resume signal transmitter for signaling devices external to said transmitter system.

11. The system of claim 10, wherein said temperature sensing and control device comprises a temperature dependent drive device thermally coupled to said transmitter.

12. The system of claim 11, wherein said switch comprises an infrared emitter drive circuit.

13. The system of claim 10, wherein said temperature sensing and control means further emits a status signal, said status perceptible to the human senses.

14. The system of claim 13, wherein said status signal is emitted in response to said temperature sensing and control means sensing said overtemperature condition or in response to said sensing and control means sensing a normal temperature in said transmitter.

15. The system of claim 14, wherein:

said temperature sensing and control means further detects a temperature fatigue condition in said transmitter; and said status signal is emitted in response to said sensing of said temperature fatigue condition.

* * * * *